US006443097B1

(12) United States Patent
Zohar et al.

(10) Patent No.: US 6,443,097 B1
(45) Date of Patent: Sep. 3, 2002

(54) RECIRCULATING MARINE AQUACULTURE PROCESS

(75) Inventors: Yonathan Zohar, Baltimore; Stanley Serfling, Frederick; John Stubblefield, Lutherville; Alan Place; Mordechai Harrel, both of Baltimore, all of MD (US)

(73) Assignee: University of Maryland Biotechnology Institute, Baltimore, MD (US)

( * ) Notice: Subject to any disclaimer, the term of this patent is extended or adjusted under 35 U.S.C. 154(b) by 0 days.

(21) Appl. No.: 09/810,640

(22) Filed: Mar. 16, 2001

(51) Int. Cl.[7] .............................................. A01K 61/00
(52) U.S. Cl. ........................ 119/217; 119/215; 119/225
(58) Field of Search ................................ 119/217, 215, 119/227, 231, 233, 216, 218, 260, 259; 210/614, 169, 739

(56) References Cited

U.S. PATENT DOCUMENTS

| | | |
|---|---|---|
| 3,683,853 A | 8/1972 | Lewis |
| 3,683,854 A | 8/1972 | Lewis |
| 3,709,195 A | 1/1973 | Taab |
| 3,738,317 A | 6/1973 | Reynolds |
| 4,052,960 A | 10/1977 | Birkbeck et al. |
| 4,211,183 A | 7/1980 | Hoult |
| 4,738,220 A | 4/1988 | Ewald, Jr. |
| 4,913,093 A | 4/1990 | VanGorder |
| 5,038,715 A | 8/1991 | Fahs, II |
| 5,046,451 A | 9/1991 | Inslee et al. |
| 5,158,037 A | 10/1992 | Engelbart |
| 5,176,100 A | 1/1993 | Fujino |
| 5,178,093 A | 1/1993 | Reese et al. |
| 5,181,479 A | 1/1993 | Hiebert |
| 5,216,976 A | 6/1993 | Marinkovich |
| 5,227,055 A | 7/1993 | Timmons |
| 5,232,586 A | 8/1993 | Malone |
| 5,288,705 A | 2/1994 | Zohar |
| 5,293,839 A | 3/1994 | Jorgensen |
| 5,466,373 A | 11/1995 | Handwerker et al. |
| 5,556,536 A | 9/1996 | Turk |
| 5,643,877 A | 7/1997 | Zohar |
| 5,660,142 A | 8/1997 | Van Rijn |
| 5,732,654 A | 3/1998 | Perez et al. |
| 5,762,024 A | 6/1998 | Meilahn |
| 5,791,290 A | 8/1998 | Mueller |
| 5,947,057 A | 9/1999 | Perez et al. |
| 5,961,831 A | * 10/1999 | Lee et al. .................... 119/204 |
| 6,041,738 A | 3/2000 | Hemauer et al. |

OTHER PUBLICATIONS

Zohar et al. Gonadotropin–Releasing Activities of the Three Native Forms of Gonadotropin–Releasing Hormone Present in the Brain of Gilthead Seabream. Gen. & Com. Endo. 97, 289–299 (1995).
Bromage & Roberts, Eds. Broodstock Management and Egg and Larval Quality.
Mylonas et al. Preparation and evaludation of polyanhydride microspheres containing gonadotropin–releasing hormone (GnRH), for inducing ovulation and spermiation of fish. Jour. Of Cont. Res. 35 (1995) 23–34.
Mylonas et al. Induced spawning of wild American Shad using sustained administration of Gonadotropin–Releasing Hormone Analog (GnRHa). Jour. Of the World Aquaculture Soc. vol. 26, No. 3, Sep. 1995.
Hassin et al. Molecular cloning and sequence analysis of striped bass gonadotrophin–I and –II subunits. Jour. Of Mol. Endo. (1995) 15, 23–35.
Gothilf et al. Molecular cloning and characterization of a novel gonadotropin–releasing hormone from the gilthead Seabream. Mol. Marine Bio. and Biotech. (1995) 4(1), 27–35.
Elizur et al. Gonadotropins B–GtHI and B–GtHII from the Gilthead Seabream. Gen. And Com. Endo. 102, 39–46 (1996).
Sorbera et al. Sustained Administration of GnRHa Increase Milt Volume Without Altering Sperm Counts in the Sea Bass. The Jour. Of Exp. Zoo. 276:361–368 (1996).
Zohar. New Approaches for the Manipulation of Ovulation and Spawning in Farmed Fish. Bull. Natl. Res. Inst. Aquacult. Suppl. 2: 43–48 (1996).
Holland et al. Gonadal Development and Plasma Seroid Levels During Pubertal Development in Captive–Reared Striped Bass. Jour. Of Exp. Zoo. 286:49–63 (2000).
Hassin et al. Ontogeny of Follicle–Stimulating Hormone and Luteinizing Hormone Gene Expression During Pubertal Development in the Female Striped Bass. Bio. Of Rep. 61, 1608–1615.
Holland et al. Levels of the Native Forms of GnRH in the Pituitary of the Gilthead Seabream, at Several Characteristic Stages of the Gonadal Cycle. Gen. and Com. Endo. 112, 394–405 (1998).
Holland et al. Effects of Long–Term Testosterone, Gonadotropin–Releasing Hormone Agonist, and Pimozide Treatments on Gonadotropin II Levels and Ovarian Development in Juvenile Female Striped Bass. Bio. Of Rep. 59, 1153–1162 (1998).

(List continued on next page.)

Primary Examiner—Yvonne R. Abbott
(74) Attorney, Agent, or Firm—Steven J. Hultquist; Marianne Fuierer; Yongzhi Yang

(57) ABSTRACT

A high efficiency recirculating marine aquaculture process for producing fish at variable yield densities of up to 60 kg/meter$^3$ of the aquaculture tank, including fish that spawn under short photoperiods such as gilthead seabream (*Sparus aurata*) as well as fish that spawn under long photoperiods such as striped bass (*Morone saxatilis*). The process involves broodstock conditioning, spawning/reproduction, larval growth, nursery, and adult grow-out operations. The process is characterized by high-rate growth at optimal process conditions requiring less than 10% daily water exchange, thereby enabling effluent waste from the system to be discharged to a municipal sewer after disinfection treatment, which in turn permits siting of the aquaculture process facility in urban/suburban locations where aquaculture processes have been previously infeasible.

61 Claims, No Drawings

OTHER PUBLICATIONS

Mylonas et al. Endocrine Profiles of Female Striped Bass in Captivity, during Postvitellogenesis and Induction of Final Oocyte Maturation via Controlled–Release GnRHa–Delivery Systems. Gen and Com. Endo. 110, 276–289 (1998).

Hassin et al. Gonadotropin–I and –II Subunit Gene Expression of Male Striped Bass after Gonadotropin–Releasing Hormone Analogue Injection: Quantitation Using an Optimized Ribonuclease Protection Assay. Bio. Of Rep. 58, 1233–1240 (1998).

Gothilf, et al. Preovulatory Changes in the Levels of Three Gonadotropin–Releasing Hormone–Encoding Messenger Ribonucleic Acid (mRNAs), Gonadotropin B–Subunit mRNAs, Plasma Gonadotropin, and Steroids in the Female Gilthead Seabream. Bio. Of Rep. 57, 1145–1154 (1997).

Mylonas et al. Changes in Plasma Gonadotropin II and Sex Steroid Hormones, and Sperm Production of Striped Bass after Treatment with Controlled–Release Gonadotropin–Releasing Hormone Agonist–Delivery Systems. Bio. of Rep. 57, 669–675 (1997).

Mylonas et al. Plasma Gonadotropin II, Sex Steroids, and Thyroid Hormones in Wild Striped Bass during Spermiation and Final Oocyte Maturation. Gen. and Com. Endo. 108, 223–236. (1997).

Mananos et al. Purification of Gonadotropin II from a Teleost Fish, the Hybrid Striped Bass, and Development of a Specific Enzyme–Linked Immunosorbent Assay. Gen. and Com. Endo. 108, 209–222 (1997).

Gothilf et al. Three Forms of Gonadotropin–Releasing Hormone in a Perciform Fish: Complementary Deoxyribonucleic Acid Characterization and Brain Localization. Bio. of Rep. 55, 636–645 (1996).

Mylonas et al. Application of Controlled–Release, GnRHa–delivery Systems in Commercial Production of White Bass x Striped Bass Hybrids (sunshine bass), using captive broodstocks. Aquaculture 140 (1996) 265–280.

Chow et al. Multiple GnRHs present in a teleost species are encoded by separate genes: analysis of the sbGnRH and cGnRH–II genes from striped bass. Jour. Of Mol. Endo. (1998) 21, 277–289.

Mylonas et al. Cyto–histological examination of post–vitellogenesis and final oocyte maturation in captive–reared striped bass. Jour. Of Fish Bio. (1997) 50, 34–49.

Cueto et al. An Atlas of the Brain of the Gilthead Seabream. A Maryland Sea Grant Publication, 2001.

* cited by examiner

RECIRCULATING MARINE AQUACULTURE PROCESS

BACKGROUND OF THE INVENTION

1. Field of the Invention

The present invention relates to a recirculating marine aquaculture process.

2. Description of the Art

In recent years the world has witnessed an alarming decline in commercial fisheries, the result of overfishing and environmental degradation. According to the Food and Agriculture Organization (FAO) of the United Nations, nearly 70% of the world's commercial marine fisheries species are now fully exploited, overexploited or depleted.

Based on anticipated population growth, it is estimated that the world's demand for seafood will double by the year 2025. Therefore, a growing gap is developing between demand and supply of fisheries products, which results in a growing seafood deficit. Even the most favorable estimates project that in the year 2025 the global demand for seafood will be twice as much as the commercial fisheries harvest.

The same trend is present in the U.S. Per capita consumption of seafood by Americans increased 25% from 1984 to 1994, and continues to increase. As a result, the United States has become highly dependent on imported seafood. The U.S. is, after Japan, the world's largest importer of seafood. The value of fish imports increased by nearly 80% between 1985 and 1994 to a record level of nearly $12 billion U.S. This has resulted in a trade deficit of $7 billion U.S. for edible seafood, which is, after petroleum, the largest contributor to the U.S. trade deficit among natural products and the largest deficit among all agricultural products.

It is very clear that the only way to meet the world's growing needs in fisheries products, and to reverse the U.S. fisheries trade deficit, is through marine aquaculture systems—the farming of aquatic organisms in controlled environments. In response to the situation, global aquaculture production is expanding quickly. Aquaculture's contribution to the world's seafood supplies increased from 12 to 19% between 1984 and 1994. U.S. aquaculture production has also grown steadily in the 1980's and 1990's and it is the fastest growing agricultural industry. However, despite the recent growth of the U.S. industry, only 10% of the seafood consumed in the U.S. comes from domestic aquaculture, and the U.S. ranks only tenth in the world in the value of its aquaculture production.

Worldwide, it is estimated that in order to close the increasing gap between demand and supplies of fish products, aquaculture will need to increase production three-to-four-fold during the next two and a half decades. In this context, there is a compelling motivation to develop aquaculture systems of improved and commercially viable character for high volume production of fish and environmental sustainability.

While there is a strong impetus to develop high-rate production aquaculture systems, it is clear that finfish farming must develop as a sustainable industry without having an adverse impact on the environment. In many countries including the U.S., fish are grown in either earthen ponds or in floating net pens in the marine coastal environments. Both systems have an adverse impact on the environment, in some cases resulting in massive degradation of aquatic and marine resources. Moreover, such systems are far from offering optimal conditions for the desired performances and production.

In an effort to eliminate the effects of marine aquaculture on the environment and to optimize aquaculture production, a new environmentally acceptable fish farming technology has recently emerged: the use of recirculated marine aquaculture systems (RMAS), in which the same water is continuously reused in operation of the system.

RMAS can be effectively used for fish farming without having any effect on the environment. These systems have many advantages over non-recirculating systems.

Water re-use in the RMAS minimizes any adverse environmental burden created by the aquaculture system since there is minimal net waste material generation, and what waste is generated is easily handled by local sewer systems. RMAS offer flexibility in location options (urban, rural, inland) since they are not confined to coastal areas or open oceans. Unlike free-floating pens, process conditions can be better controlled within a RMAS.

In general, the fish farming methods and aquaculture systems of the prior art are poorly integrated in respect of the life stages of the fish species of interest and the process conditions associated therewith. As a result, the commercial aquaculture systems developed to date are highly variable in efficiency and output of fish. Such systems are subject to numerous processing and operational deficencies, including: sub-optimal production of fish; absence of control of process conditions; process instability; susceptibility to environmental pathogens; suceptibility to pollution; loss of stock; and the lack of well-defined optimal conditions for achieving maximal growth and production of the fish species being raised in the aquaculture system.

There is therefore a basic need in the art of fish farming for aquaculture systems of improved character, for high performance production of fish species.

In respect of the present invention, as hereinafter more fully described, the following references are noted, and their disclosures hereby incorporated herein by reference:

U.S. Pat. No. 5,176,100 to Fujino (biofiltration aquarium systems utilizing microbial growth on plastic substrate elements for metabolic waste removal);

U.S. Pat. No. 5,227,055 to Timmons (closed cycle aquaculture system including a is rotating biological contactor);

U.S. Pat. No. 5,038,715 to Fahs, II (enclosed aquaculture system comprising progressively larger tanks connected in series to accommodate fish growth);

U.S. Pat. No. 5,718,093 to Reese et al. (aquaculture vessel with recirculating open-cell foam media for aeration and waste removal);

U.S. Patent Nos. 5,732,654 and 5,947,057 to Perez et al. (mariculture system including activated carbon treatment enabling use of polluted source water);

U.S. Pat. No. 5,232,586 to Malone (hourglass-shaped biofilter containing floating media supporting biofloc and nitrifying bacteria);

U.S. Pat. No. 4,211,183 to Hoult (open system including a biological water filter, and removal of sludge from bacterial mat, for growth of fish to marketable size);

U.S. Pat. No. 5,762,024 to Meilahn (pump-equipped floating tank aquaculture system for pump-mediated displacement of water, to remove nitrogen wastes and introduce oxygen);

U.S. Pat. No. 6,041,738 to Hemauer et al. (fish pond including deepened central region, in combination with a settling pond and a decompositon pond for biological decomposition of wastes by plants);

U.S. Pat. No. 5,556,536 to Turk (anaerobic bacterial denitrification of fluids, e.g., in aquaculture systems);

U.S. Pat. No. 5,293,839 to Jörgensen (aquaculture tank with liquid level-responsive siphon/suction unit for waste removal);

U.S. Pat. No. 4,738,220 to Ewald, Jr. (fish farm and hatchery system with comparted tankage for brood fish retention, fertilized egg collection, fish feed cultivation and grow-out);

U.S. Pat. No. 5,046,451 to Inslee et al. (fish farm and hydroponic greenhouse system with intercirculation between fish tank and hydroponic network);

U.S. Pat. No. 5,466,373 to Handwerker et al. (biofilter using amphipods, e.g., *Hyalella azieca*);

U.S. Pat. No. 3,709,195 to Tabb (floating fish pens for open sea use);

U.S. Pat. No. 3,738,317 to Reynolds (egg trays for growth of fresh water fish species);

U.S. Pat. No. 3,683,853 to Lewis (fish egg incubator suspended in a body of water by a buoyant collar);

U.S. Pat. No. 5,791,290 to Mueller (a fish larval incubator with skimmer, gas controller and waste evacuation means);

U.S. Pat. No. 5,181,479 to Hiebert (fish eggs/larvae collection/preservation system);

U.S. Pat. No. 3,683,854 to Lewis (device by which fertilized eggs are transported over a barrier into a holding container, thereby separating viable from non-viable eggs);

U.S. Pat. No. 5,961,831 to Lee et al. (automated aquaculture system including biofilters, video monitoring, ultraviolet radiation/ozonation purification);

U.S. Pat. No. 4,052,960 to Birkbeck et al. (fish rearing system with filtration/ozonation treatment of recycling water);

U.S. Pat. No. 5,158,037 to Engelbart (aquaculture system including aerated breeding pond, sludge settling pond and algae-pool);

U.S. Pat. No. 4,913,093 to VanGorder (multi-tank culturing method in which fish population in a tank is subdivided and each resultant subpopulation is introduced to a separate tank of a corresponding number of additional tanks, as population equals or exceeds tank capacity);

U.S. Pat. No. 5,216,976 to Marinkovich (domed aquaculture chamber overlying body of water that is heated with bubbled air for growth of non-native post-larval organisms);

U.S. Pat. No. 5,643,877 and U.S. patent application Ser. No. 08/912,314 to Zohar et al. (method of fish spawning promotion by administration of a peptide of the formula pGlu-His-Trp-Ser-Tyr-$R_6$-Leu-X-Pro-$R_{10}$-NHR, as defined in such patent);

U.S. Pat. No. 5,288,705 to Zohar (manipulation of fish ovulation and spawning by administration of gonadotropin-releasing hormone (GnRH), luteinising releasing hormone (LHRH) and analogs, in a polymer based sustained release delivery system);

Zohar, Y., "Fish Reproduction: Its Physiology and Artificial Manipulation," Chapter 3, Fish Culture in Warm Water Systems: Problems and Trends, Shilo, M. and Sarig, S., eds., CRC Press, Inc., Boca Raton;

Bead Filter Catalog, 1988, Aquaculture Systems Technologies, LLC, P.O. Box 15827, New Orleans, La. 70175-0827;

Zohar, Y., Doering, D and Langer, B. (1994), Application of controlled release technology in aquaculture, Proc. Intern. Symp. Control. Rel. Bioact. Mater. 21: 110–111;

Powell, J. F. F., Zohar, Y., Elizur, A., Park, M., Fischer, W. H., Craig, A. G., Rivier, J. F., Lovejoy, D. A. and Sherwood, N. M. (1994), Three forms of gonadotropin-releasing hormone characterized from brains of one species, Proc. Natl. Acad. Sci. USA 91: 12081–12085;

Zohar, Y., Elizur, A., Sherwood, N. M., Rivier, J. F. and Zmora, N. (1995), Gonadotropin-releasing potencies of the three native forms of gonadotropin-releasing hormones present in the brain of gilthead seabream, *Sparus aurata*, Gen. Comp. Endocrinol. Gen. Comp. Endo. 97: 289–299;

Zohar, Y., Harel, M., Hassin, S. and Tandler, A. (1995), Broodstock management and manipulation of spawning in the gilthead seabream, *Sparus aurata*. In: "Broodstock Management and Egg and Larval Quality" (N. Bromage and R .J. Roberts, eds.) pp 94–117, Blackwell Sci. Press., London;

Mylonas, C. C., Tabata, Y., Langer, R. and Zohar, Y. (1995), Preparation and evaluation of polyanhydride microspheres containing gonadotropin-releasing hormone (GnRH), for inducing ovulation and spawning in fish, J. Cont. Rel. 35: 23–34;

Mylonas, C. C., Richardson, B. M., Minkinnen, S. P. and Zohar, Y. (1995), Induced spawning of American shad (*Alosa sapidissima*) using sustained administration of gonadotropin-releasing hormone analog (GnRHa), J. World Aquac. Soc. 26: 39–50;

Hassin, S., Elizur, A. and Zohar, Y. (1995), Molecular cloning and sequence analysis of striped bass (*Morone saxatilis*) gonadotropins I and II subunits, J. Mol. Endocrinol. 15: 23–35;

Gothilf, Y., Chow M., Elizur, A., Chen, T. T. and Zohar, Y. (1995), Molecular cloning and characterization of a novel gonadotropin-releasing hormone from gilthead seabream (*Sparus aurata*), Marine Mol. Biol. Biotech. 4: 27–35;

Zohar, Y. (1996), New approaches for the manipulation of ovulation and spawning in farmed fish, Bull. Natl. Res. Inst. Aquacult. Suppl. 2: 43–47;

Mylonas, C. C., Magnus, Y., Gissis, A., Klebanov, Y. and Zohar, Y. (1996), Application of controlled-release, GnRHa delivery systems in commercial production of white bass×striped bass hybrids (sunshine bass), using captive broodstocks, Aquaculture: 140: 265–280;

Elizur, A., Zmora, N., Rosenfeld, H., Meiri, I., Hassin, S., Gordin, H. and Zohar, Y. (1996), Gonadotropins beta-GtHI and beta-GtHII from the gilthead seabream, *Sparus aurata*, Gen. Comp. Endocrinol., 102: 39–46;

Gothilf, Y., Munoz-Cueto J. A., Sagrillo, C. A., Selmanoff, M., Chen, T. T., Kah, O., Elizur, A. and Zohar, Y. (1996), Three forms of gonadotropin-releasing hormone in a perciform fish (*Sparus aurata*): cDNA characterization and brain localization, Biol. Repro. 55: 636–645;

Sorbera, L. A., Mylonas, C. C., Zanuy, S., Carrillo, M. and Zohar, Y. (1996), Sustained administration of GnRHa increases sperm volume without altering spern counts in the seabass (*Dicentrarchus labrax*), J. Exp. Zool. 276: 361–368;

Mylonas, C. C., Woods, L. C. and Zohar, Y. (1997), Cyto-histological study of ovarian development and final oocyte maturation in captive-reared striped bass, J. Fish Biol. 50: 34–49;

Mylonas, C. C., Magnus, Y., Gissis, A., and Zohar Y. (1997), Reproductive biology and endocrine regulation of final oocyte maturation in captive-reared white bass (*Morone chrysops*), Journal of Fish Biology, 51: 234–250;

Mananos, E., Swanson, P., Stubblefield, J. and Zohar, Y. (1997), Purification of gonadotropin-II from a teleost fish, the hybrid striped bass, and development of a specific enzyme-linked immunosorbent assay, Gen. Comp. Endocrinol. 108: 209–222;

Mylonas, C. C., Scott, A. P. and Zohar, Y. (1997), Plasma gonadotropin II, sex steroids, and thyroid hormones in wild striped bass (*Morone saxatilis*) during spermiation and final oocyte maturation, Gen. Comp. Endocrinol. 108: 223–236;

Mylonas, C. C., Scott, A. P., Vermeirssen, E. L. M. and Zohar, Y. (1997), Changes in plasma gonadotropin II and sex-steroid hormones, and sperm production of striped bass after treatment with controlled-release gonadotropin-releasing hormone agonist-delivery systems, Biol. Reprod. 57: 669–675;

Gothilf, Y., Meiri, I., Elizur, A. and Zohar, Y. (1997), Preovulatory changes in the levels of three gonadotropin-releasing hormone-encoding messenger ribonucleic acids (mRNAs), gonadotropin beta subunit mRNAs, plasma gonadotropin, and steroids in the female gilthead seabream, *Sparus aurata*, Biol. Repro. 57: 1145–1154;

Hassin, S., Gothilf, Y., Blaise, O., and Zohar, Y. (1998), Gonadotropin-I and -II subunit gene expression of the male striped bass after gonadotropin-releasing hormone analog injection: quantitation using an optimized ribonuclease protection assay, Biol. Reprod. 58: 1233–1240;

Mylonas, C. C., Woods, L. C., Thomas, P. and Zohar, Y. (1998), Endocrine profiles of female striped bass (*Morone saxatilis*) during post-vitellogenesis and induction of final oocyte maturation and spawning using controlled-release GnRH-delivery systems, Gen. Comp. Endocrinol. 110: 276–289;

Holland, M C., Hassin, S. and Zohar, Y. (1998), Effects of long-term testosterone, gonadotropin-releasing hormone agonist and pimozide treatments on gonadotropin-II levels and ovarian development in juvenile striped bass, Biol. Reprod. 59: 1153–1162;

Holland, M. C. H., Gothilf, Y., Meiri, I., King, J. A., Okuzawa, K., Elizur, A. and Zohar, Y. (1998), Levels of the native forms of GnRH in the pituitary of the gilthead seabream, *Sparus aurata*, at several characteristic stages of the gonadal cycle, Gen. Comp. Endocrinol. 112: 394–405;

Chow, M. M., Kight, K. E., Gothilf Y., Alok D., Stubblefield, J. and Zohar, Y. (1998), Multiple GnRHs present in a teleost species are encoded by separate genes: Analysis of the sbGnRH and cGnRH-II genes from the striped bass, *Morone saxatilis*, J. Mol. Endo. 21: 277–289;

Hassin, S., Holland, M. C. H. and Zohar, Y. (1999), Ontogeny of follicle-stimulating hormone and luteinizing hormone gene expression during pubertal development in the female striped bass, *Morone saxatilis* (Teleosti), Biol. of Reprod. 414: 1608–1615;

Holland, M. C., Hassin, S. and Zohar, Y. (2000), Gonadal development and plasma steroid levels during pubertal development in captive-reared striped bass, *Morone saxatilis*, J. Exp. Zool. 286:49–63;

Munoz-Cueto J. A, Zohar, Y. and Kah O. (2000), Brain Atlas of the gilthead seabream (*Sparus aurata*), Sea Grant Press. (In press); and Raloff, J., "Downtown Fisheries? Advances may make fish farming a healthy prospect, even for inner cities," Science News, Vol. 157, No. 20, May 13, 2000, pp. 314–316.

SUMMARY OF THE INVENTION

The present invention relates to aquaculture production of fish.

The recirculating marine aquaculture process system of the invention is adapted for achieving optimal yield of fish species at variable density grow-out conditions, e.g., at a fish density in the grow-out process of up to 60 kilograms fish per meter$^3$ of the aquaculture medium.

The invention contemplates the raising of fish species of varied type.

Further, as will be more fully appreciated based on the subsequent detailed description herein, the process of the invention may be variously embodied to incorporate any of a number of novel features, described hereinafter, that singly and aggregately with one another facilitate enhanced production of fish.

In this respect, it will be further appreciated that various parameters of the inventive process may be selectively varied if of particular importance to the particular species being cultured (e.g., water temperature in cyprinid species), such parameters and their species-sensitive character being readily determinable without undue experimentation by those of ordinary skill in the field of the invention.

Thus, while the invention is hereinafter variously described in reference to specific process condition manipulations (e.g., photoperiod changes) and particular fish species (e.g., Gilthead seabream (*Sparus aurata*) and striped bass (*Morone saxatilis*), it will be appreciated that such descriptions are of an illustrative character only, and that the process of the present invention is susceptible of general implementation and operation within the skill of the art, based on the disclosure herein.

Particularly preferred varieties for closed, recirculating marine system fish farming using the process of the invention include seabream, striped bass, tilapia, barramundi, flounder, turbot, seabass, red snapper, red drum and salmon.

In accordance with one aspect of the invention, distinct process conditions are applicable to fish species that spawn under short photoperiod (light exposure) conditions, e.g., gilthead seabream, and to fish species that spawn under long photoperiod conditions, e.g., striped bass.

As used herein, short photoperiod spawning species are those that in the wild environment spawn mainly during diurnal natural light exposures of <12 hours light, while long photoperiod spawning species are those that in the wild environment spawn mainly during diurnal light exposures of ≧12 hours.

As used herein, the term "regime" refers to concurrent changes of parameters of the process (e.g., photoperiod, temperature, salinity, dissolved oxygen, population density).

Such concurrent changes of process parameters are employed to achieve a regulated process in specific stages or steps of the aquaculture process.

The closed, recirculating marine aquaculture process of the invention involves simultaneous manipulation and then continuous monitoring and control of three key process factors: (1) photoperiod, (2) water temperature, and (3)

water chemistry (salinity, dissolved oxygen, ozone level, pH, etc.). For each species, these process conditions are manipulated/tailored to achieve optimal performance. For some illustrative fish species, such as Gilthead seabream (*Sparus aurata*) and striped bass (*Morone saxatilis*), photoperiod for broodstock conditioning and spawning is a key factor, while in other illustrative fish species, water temperature and/or water chemistry have primary impact on optimal fish production. Specific operational characteristics for a particular fish species in a particular application of the invention will be readily determinable, within the skill of the art and on the basis of the disclosure herein, for marine fish that spawn under short photoperiod conditions as well as for marine fish that spawn under long photoperiod conditions.

In one aspect, the invention relates to a recirculating marine aquaculture process for production of marine fish, including (i) a broodstock conditioning, (ii) spawning, (iii) egg incubation, (iv) larval growth, (v) nursery post-larval growth, and (vi) grow-out of fish to a final product weight, in which each stage (i)–(vi) of the process involves operation in an aqueous medium that is coupled in liquid recirculation relationship with means for removing waste components from the aqueous medium and returning purified aqueous medium to the external environment. The process involves operation in a closed, recirculating aquaculture system in which photoperiod, water temperature, water chemistry, and diet are optimized and then continuously monitored and controlled for the particular marine species, to obtain optimal production at each of the six phases (i)–(vi) of the life cycle.

The recirculating marine aquaculture process in a specific embodiment adapted for short photoperiod spawning marine finfish species such as gilthead seabream, involves growth and cultivation of the marine finfish in life-cycle stages including broodstock conditioning, spawning, egg incubation, larval rearing, nursery processing, and grow-out. The process includes the steps of:

providing recirculated aqueous media tanks for populations in the life-cycle stages for marine fmfish production;

continuously recirculating aqueous medium and treating the aqueous medium for removal of waste therefrom;

admininstering, as needed, gonadotropin-releasing hormone (GnRH) or GnRH agonist to a broodstock population of said marine finfish prior to spawning; and maintaining process conditions in said aqueous media for the life-cycle stages in accordance with PROCESS CONDITIONS correlative to LIFE-CYCLE STAGE in Table A below:

TABLE A

| LIFE CYCLE STAGE | PROCESS CONDITIONS |
|---|---|
| Broodstock conditioning | Salinity: 15 ppt–40 ppt (optimal 30 ppt)<br>Temperature: 15–22° C. (optimal 18–20° C.)<br>Dissolved $O_2$(DO): >3 ppm<br>Population Density: 10–30 kg/m$^3$<br>Photoperiod and Thermal Regimes:<br>simulated natural photoperiod and thermal regimes<br>simulating natural environmental conditions. (See<br>information on photoperiod shifting.)<br>Diet: Fish are fed 1–3 times daily with 1–1.5% per kg<br>body weight, per day of squid meal-based dry<br>pellets, composed of 50–55% protein and 10–<br>15% marine-type lipid. The lipids contain at<br>least 5% n-3 highly unsaturated fatty acids<br>(HUFA), mainly of the 22:6 n-3 (DHA) type.<br>This diet is fed to the broodstock starting at<br>least 15 days before initiation of spawning.<br>Alternatively, fish may be fed 1–1.5% of dry<br>commercial pellets, supplemented with 2–3% of<br>chopped frozen squid.<br>Additional considerations (for exampler species gilthead seabream):<br>1. Seabream used as broodstock are 2–6 years old. They are<br>   stocked in tanks of 4–20 cubic meters, at the population densities<br>   specified above.<br>2. The sex ratio at stocking is 1:1, albeit the ratio changes over the<br>   years. Adding younger fish to older populations should be<br>   avoided, as it may induce all older males to change sex.<br>3. In order to obtain out-of-season spawning, the tanks should be<br>   either indoors or covered to allow photoperiod, temperature and<br>   salinity manipulations. By manipulating the process, eggs can<br>   be obtained all year round (Zohar, et al. (1995), Broodstock<br>   management and manipulation of spawning in the gilthead<br>   seabream, *Sparus aurata*. In: "Broodstock Management and Egg<br>   and Larval Quality" (N. Bromage and R. J. Roberts, eds.) pp 94–<br>   117, Blackwell Sci. Press., London).<br>4. Spawning is initiated by treating the females and males with<br>   gonadotropin-releasing hormone agonist (GnRHa) delivery<br>   systems, as described in Zohar, Bull. Natl. Res. Inst. Aquacult.<br>   Suppl. 2:43–47, 1996, and Zohar, et al. (1995), Broodstock<br>   management and manipulation of spawning in the gilthead<br>   seabream, *Sparus aurata*. In: "Broodstock Management and Egg<br>   and Larval Quality" (N. Bromage and R. J. Roberts, eds.) pp 94–<br>   117, Blackwell Sci. Press., London. GnRHa preferably is<br>   administered in a sustained release form at a dose in a range of<br>   from about 25 to about 100 micrograms per kg body weight of |

TABLE A-continued

| LIFE CYCLE STAGE | PROCESS CONDITIONS |
|---|---|
| | females and at a dose in a range of from about 15 to about 30 micrograms per kg of body weight of males. Males fertilize the eggs as soon as they are spawned. Spawning typically starts 48–72 hr after the hormonal treatment. In the first few days of induced spawning, spawning may occur at different times of the day. |
| Spawning | Salinity: 15–40 ppt (optimal 30 ppt)<br>Temperature: 15–24° C. (optimal 18–20° C.)<br>Dissolved $O_2$ (DO): >3 ppm<br>Population density: 10–30 kilograms/m$^3$<br>Photoperiod regime: short days, with increasing daylight of 6–12 hr light, and decreasing darkness of 18–12 hr dark, with transitions between light/dark periods of 45 minutes to 1 hour and 15 minutes, with conditions culminating in photoperiod simulating natural spawning conditions of December–April (daylight must be increasing, albeit the overall length of the day is still short at spawning).<br>Diet: polyunsaturated fatty acid (n3/n6) rich diet |
| Egg Incubation | Salinity: 15 ppt–40 ppt (optimal 30 ppt)<br>Temperature: 15–22° C.<br>Dissolved $O_2$ (DO): >5 ppm<br>Population density: on the order of 100 eggs/liter volume, e.g., in a range of from about 75 to about 150 eggs/liter volume; egg incubation period is from about 36 to about 48 hr<br>Photoperiod regime: no photoperiod requirement |
| Larval rearing | Salinity: 15 ppt–40 ppt (optimal 25–30 ppt)<br>Temperature: 15–22° C., occurring in a gradual increase concurrent with larval development (18–22° C. is optimal)<br>Dissolved $O_2$ (DO): >5 ppm; maintenance of ammonia <0.2 mg ammonia per liter of aqueous medium<br>Population Density: on the order of 100 eggs/liter volume, e.g., in a range of from about 75 to about 150 eggs/liter volume<br>Photoperiod regime: 12–16 hr light/12–8 hr dark; e.g., 14 hr light: 10 hr dark; light exposure of from 500 to 1200 lux at the water surface<br>Diet and Green Water Conditions: enriched rotifers followed by enriched artemia as follows: at the initiation of larval pigmentation, 3 days after hatching, larvae are offered enriched rotifers (*Brachionus plicatilis*) enriched for 8 hr with n3/n6 enrichment media, and algae (*Nannochloropsis sp.*), at a concentration of 10 rotifers/milliliter, and 30 × 10$^3$ cells per milliliter, respectively. The concentration of both rotifers and algae is maintained by continuous addition of both via a dispensing system. Fifteen days after hatching, the larvae are offered newly hatched Artemia nauplii for 3 days. Subsequently they are offered nauplii enriched for 16 hr with n3/n6 enrichment media. At the age of 30–35 days, the post larvae are counted and transferred to the nursery, where they are weaned from live food. |
| Nursery (nursery stage defined as 50 mg to 5 g body weight) | Salinity: 15 ppt–40 ppt<br>Temperature: 17–30° C. (optimal = 20–26° C.)<br>Dissolved $O_2$ (DO): >3 ppm<br>Population density: 10–20 fry/liter of tank; max. of 1500 individuals/m$^3$; larvae grown through fry development to a predetermined weight, generally from about 50 mg to about 5 g<br>Photoperiod regime: 15–17 hr of light exposure per day<br>Diet: Weaning from live food to formulated diet (weaning diet followed by formulated commercial diet). |
| Grow-out | Salinity: 5–40 ppt (optimal = 15 ppt–25 ppt)<br>Temperature: 17–30° C. (optimal = 20–26° C.)<br>Dissolved $O_{2\ (DO):\ 4–6\ ppm}$<br>Population density: variable density up to 60 kilograms/m$^3$<br>Water exchange: 2–4 tank volumes/hr.<br>Photoperiod regime: 16–20 hr light exposure per day (optimal = |

TABLE A-continued

| LIFE CYCLE STAGE | PROCESS CONDITIONS |
|---|---|
| | 18 hr light), preferably with about 1 hour of increasing light intensity from darkness to light exposure and preferably with about 1 hour of decreasing light intensity from light exposure to darkness<br>Feeding: 6–25 times/day of pelleted commercial diet, with fish fed a percentage of their body weight, and with percentage varied as fish increase in size<br>pH: 7.4–7.8 |

A further aspect of the invention relates to a process for raising fish species spawning under long photoperiod conditions, e.g., striped bass, in life-cycle stages including broodstock conditioning, spawning, egg incubation, larval rearing, nursery processing, and grow-out. The process includes the steps of:

providing recirculated aqueous media tanks for populations in the life-cycle stages for marine finfish production;

continuously recirculating aqueous medium in such tanks and treating the aqueous medium for removal of waste therefrom;

admininstering, as needed, gonadotropin-releasing hormone or GnRH agonist to a broodstock population of the marine finfish prior to spawning; and maintaining process conditions in said aqueous media tanks for the life-cycle stages in accordance with PROCESS CONDITIONS correlative to LIFE-CYCLE STAGE in Table B below:

TABLE B

| LIFE CYCLE STAGE | PROCESS CONDITIONS |
|---|---|
| Broodstock conditioning (example species = striped bass) | Salinity: 4 ppt–20 ppt (optimal 8–10 ppt)<br>Temperature: 13–22° C. (optimal 14–18° C.)<br>Dissolved $O_{2\ (DO):\ >3\ ppm}$<br>Population Density: 10–20 kg/m$^3$<br>Photoperiod and thermal Regimes: simulated natural photoperiod and thermal regimes to simulate natural environmental conditions. (see also "additional considerations" below for information on photoperiod shifting.)<br>Diet: Fish are fed 1–3 times daily with 1–1.5% per kg body weight, per day of squid meal-based dry pellets, composed of 50–55% protein and 10–15% marine-type lipid. The lipids contain at least 5% n-3 HUFA, mainly of the 22:6 n-3 (DHA) type. This diet is fed to the broodstock starting at least 15 days before initiation of spawning. Alternatively, fish may be fed 1–1.5% of dry commercial pellets, supplemented with 2–3% of chopped frozen squid.<br>Additional considerations (for striped bass as illustrative long photoperiod spawning species):<br>1. Striped bass used as broodstock are 3–10 years old or older. They are stocked in tanks of 4–20 cubic meters, at the densities specified above.<br>2. The sex ratio at stocking 1:1 or 1:2, albeit other ratios can usually be employed.<br>3. In order to obtain out-of-season spawning, the tanks should be either indoors or covered to allow photoperiod, temperature and salinity manipulations. By manipulating the process conditions, eggs can be obtained all year round.<br>4. Spawning is initiated by treating the females and males with GnRHa delivering systems, as described in Mylonas, C.C., Tabata, Y., Langer, R. and Zohar, Y. (1995), Preparation and evaluation of polyanhydride microspheres containing gonadotropin-releasing hormone (GnRH), for inducing ovulation and spawning in fish, J. Cont. Rel. 35: 23–34; Mylonas, C.C., Magnus, Y., Gissis, A.Klebanov, Y. and Zohar, Y. (1996), Application of controlled-release, GnRHa delivery systems in commercial production of white bass x striped bass hybrids (sunshine bass), using captive broodstocks, Aquaculture: 140: 265–280; and Mylonas, C.C., Woods, L.C., Thomas, P. and Zohar, Y. (1998), Endocrine profiles of female striped bass (*Morone saxatilis*) during post-vitellogenesis and induction of final oocyte maturation and spawning using controlled-release GnRH-delivery systems, Gen. Comp. Endocrinol. 110: 276–289. |

TABLE B-continued

| LIFE CYCLE STAGE | PROCESS CONDITIONS |
| --- | --- |
| | Both females and males are generally treated. Males fertilize the eggs as soon as they are spawned. Spawning typically starts 48–72 hr after the hormonal treatment. Spawning may occur at different times of the day. |
| Spawning | Salinity: 4–20 ppt (8–10 ppt is optimal)<br>Temperature: 13–22° C. (18–21° C. is optimal)<br>Dissolved $O_2$ (DO): >3 ppm<br>Population density: 10–20 kilograms/m$^3$<br>Photoperiod regime: increasing days of 12–15 hr light and 12–9 hr dark with transitions between light/dark periods of 45 minutes to 1 hour and 15 minutes; conditions culminate in photoperiod simulating natural spawning conditions of April–May. |
| Egg Incubation | Salinity: 0 ppt–10 ppt (2–4 ppt is preferred)<br>Temperature: 18–22° C. (22° C. is optimal)<br>Dissolved $O_2$ (DO): >5 ppm<br>Population density: 2000 eggs/liter volume (= 2 g of eggs/L); more generally a density in the range of from about 1500 to about 2500 eggs/liter volume; remove dead eggs before hatching/gastrulation<br>Photoperiod regime: no photoperiod requirement |
| Larval Rearing | Salinity: 2 ppt–4 ppt<br>Temperature: 18–22° C.<br>Dissolved $O_2$ (DO): >5 ppm<br>Population Density: on the order of 100 larvae/liter volume, e.g., in a range of from about 75 to about 150 larvae/liter volume<br>Photoperiod regime: 12–16 hr light: 12–8 hr dark<br>Diet and Green Water Conditions: enriched rotifers followed by enriched artemia as follows: at the initiation of larval pigmentation, 3 days after hatching, larvae are offered rotifers (*Brachionus plicatilis*) enriched for 8 hr with n3/n6 enrichment media, and algae (*Nannochloropsis sp.*), at a concentration of 10 rotifers/milliliter and 30 × 10$^3$ cells per milliliter, respectively. The concentration of both rotifers and algae is maintained by continuous addition of both via a dispensing system. Fifteen days after hatching, the larvae are offered newly hatched Artemia nauplii for 3 days. Subsequently, they are offered nauplii enriched for 16 hr with n3/n6 enrichment media. At the age of 30–35 days, the post-larvae are counted and transferred to the nursery, where they are weaned from live food. |
| Nursery<br>(nursery stage defined as 50 mg to 5 g body weight) | Salinity: 4 ppt–20 ppt<br>Temperature 13–22° C.<br>Dissolved $O_2$ (DO): >3 ppm<br>Population density: 10–20 post-larvae/liter of tank; max. of 1500 individuals/m$^3$<br>Photoperiod regime: light exposure simulative of a natural wild wild environment<br>Diet: Weaning from live food to formulated diet (weaning diet followed by formulated commercial diet) |
| Grow-out | Salinity: 4–20 ppt<br>Temperature: 18–26° C. (optimal = 20–24° C.)<br>Dissolved $O_2$ (DO): >3 ppm<br>Population density: variable density up to 60 kg/m$^3$<br>Water exchange: 2–4 tank volumes/hr.<br>Photoperiod regime: 15–17 hr light exposure per day<br>Feeding: 6–25 times/day of pelleted commercial diet, with fish fed a percentage of their body weight, and with percentage varied as fish increase in size<br>pH: 7.4–7.8 |

In another aspect, the invention relates to a process for producing fish, by cultivation in life-cycle stages including broodstock conditioning, spawning, egg incubation, larval rearing, nursery processing, and grow-out, in a continuous recirculation aquaculture system adapted to culture corresponding populations of broodstock, eggs, larvae, fry and fish in aqueous media, wherein photoperiod, water temperature, water chemistry, and diet are optimally maintained in the life-cycle stages to achieve optimal production in such life-cycle stages.

Water may be supplied for the process from a municipal water supply following de-chlorination treatment, e.g., by contacting the municipal water with activated carbon sorbent, to constitute the aqueous medium for the broodstock conditioning, spawning, egg incubation, larval rearing, nursery processing, and grow-out life-cycle stages.

Another aspect of the invention relates to a process of grow-out of a marine finfish in an aqueous medium, including the steps of:

(a) culturing the marine finfish in a culture tank coupled in liquid recirculation flow relationship with a biofilter and mechanical filter maintained under aerobic microbial conditions;

(b) continuously circulating aqueous medium through the culture tank and the biofilter and mechanical filter coupled therewith, to remove nitrogenous wastes and solids from the aqueous medium and produce a filtered aqueous medium for recirculation to the culture tank;

(c) maintaining a circulation rate of the continuously circulating aqueous medium producing from about 1.5 to about 5 volumetric changes of the culture tank per hour;

(d) maintaining dissolved oxygen of at least 4–6 ppm in the aqueous medium in the culture tank;

(e) exposing marine finfish in the culture tank aqueous medium to a cyclic alternating light/darkness photoregime whose light period substantially exceeds duration of light exposure in a wild marine environment of said marine finfish; and (f) utilizing a hyposaline aqueous medium as the aqueous medium.

Yet another aspect of the invention relates to a method of producing marine fish at a variable yield density of up to 60 kilograms fish per cubic meter of aquaculture tank, in a recirculating aquaculture system including (i) respective aqueous medium-containing tanks for successive life-cycle stages of the fish including broodstock conditioning, spawning, egg incubation, larval rearing, nursery processing, and fish grow-out, and (ii) filtration means coupled in closed loop aqueous medium recirculation relationship with the respective tanks, so that aqueous medium from a tank is filtered for purification thereof and returned to the tank. In such process, growth conditions are maintained in each of the respective tanks by the steps of:

(a) administering nutritive material to each of the respective tanks containing fish or fish precursor feeding species;

(b) maintaining salinity, dissolved oxygen, pH, temperature and photoexposure within predetermined ranges in each of the respective tanks;

(c) utilizing a hyposaline aqueous medium as the aqueous medium in the grow-out tank; and (d) administering, as needed, gonadotropin-releasing hormone (GnRH) or GnRH agonist (GnRHa) to fish in a sustained release form prior to spawning of the fish in the spawning tank.

With respect to the administration of GnRH or GnRHa for enhancement of spawning capabilities, it will be appreciated that marine finfish will vary substantially in their need for, and reponse to, such hormonal treatment, and that some marine finfish species may not require any such augmentive treatment for carrying out spawning in an optimal manner. The dose, dose schedule, and manner and form of administration may all be varied selectively in achieving optimal spawning behavior, with optimal hormonal treatment being readily empirically determined within the skill of the art.

In one embodiment, the invention relates to a process for producing gilthead seabream (*Sparus aurata*), in a recirculating aquaculture system including respective aqueous medium-containing tanks for successive life-cycle stages, including broodstock conditioning, spawning, egg incubation, larval rearing, nursery processing and fish grow-out, wherein photoperiod, water temperature, water chemistry and diet are monitored and controlled to provide regulated process conditions in the aqueous medium tanks including the specific PROCESS CONDITIONS correlative to LIFE-CYCLE STAGE set forth in

TABLE C

| LIFE CYCLE STAGE | PROCESS CONDITIONS |
|---|---|
| Broodstock conditioning | Population Density: 10–30 kg/cubic meter of aquaculture tank<br>Salinity: 15–40 ppt<br>Photoperiod and Thermal Regimes:<br>simulated natural photoperiod and thermal regimes simulating natural environmental conditions, optionally with photoperiod, temperature and/or salinity manipulation (shifting of the photoperiod, thermoperiod and/or salinity) to enable year-round egg production |
| Spawning | Spawning Induction: inducing spawning, as needed, by treating males and females with GnRH or GnRHa<br>Salinity: 15–40 ppt<br>Photoperiod regime: diurnal exposure of 6–12 hr light and 18–12 hr dark with transitions between light/dark periods of 45 minutes to 1 hour and 15 minutes, with conditions culminating in photoperiod simulating natural spawning conditions of December–April |
| Egg Incubation | Salinity: 15 ppt–40 ppt<br>Temperature: 15–22° C.<br>Dissolved $O_2$ (DO): >5 ppm<br>Photoperiod regime: no photoperiod requirement |
| Larval rearing | Temperature: 15–22° C.<br>Salinity: 15 ppt–40 ppt<br>Photoperiod regime: 12–16 hr light/12–8 hr dark<br>Diet and Green Water Conditions:<br>"green water" environment and a diet of enriched |

TABLE C-continued

| LIFE CYCLE STAGE | PROCESS CONDITIONS |
|---|---|
| | foods including live foods |
| Nursery | Temperature: 17–30° C. |
| | Salinity: 15 ppt–40 ppt |
| | Photoperiod regime: 15–17 hr light per day |
| | Diet: weaning from live food to formulated diet |
| Grow-out | Salinity: 5–40 ppt |
| | Temperature: 17–30° C. |
| | Dissolved $O_2$ (DO): 4–6 ppm |
| | Population density: variable density up to 60 kilograms/cubic meter of tank |
| | Water exchange: 2–4 tank volumes/hr |
| | Photoperiod regime: 16–20 hr light exposure per day in a daily photo exposure cycle |
| | Feeding: 6–25 times/day of pelleted commercial diet, with fish fed a percentage of their body weight, and with percentage varied as fish increase in size |
| | pH: 7.4–7.8 |

In another embodiment, the invention relates to a process for producing striped bass (*Morone saxatilis*), in a recirculating aquaculture system including respective aqueous medium-containing tanks for successive life-cycle stages, including broodstock conditioning, spawning, egg incubation, larval rearing, nursery processing and fish grow-out, wherein photoperiod, water temperature, water chemistry and diet are monitored and controlled to provide regulated process conditions in the aqueous medium tanks including the specific PROCESS CONDITIONS correlative to LIFE-CYCLE STAGE set forth in Table D below:

TABLE D

| LIFE CYCLE STAGE | PROCESS CONDITIONS |
|---|---|
| Broodstock conditioning | Population Density: 10–20 kg/cubic meter of aquaculture tank |
| | Salinity: 4–20 ppt |
| | Photoperiod and Thermal Regimes: simulated natural photoperiod and thermal regimes simulating natural environmental conditions, optionally with photoperiod, temperature and/or salinity manipulation (shifting of the photoperiod, thermoperiod and/or salinity) to enable year-round egg production |
| Spawning | Spawning Induction: inducing spawning, as needed, by treating males and females with GnRH or GnRHa |
| | Salinity: 4–10 ppt |
| | Photoperiod regime: diurnal exposure of 12–15 hr light and 12–9 hr dark with transitions between light/dark periods of 45 minutes to 1 hour and 15 minutes, with conditions culminating in photoperiod simulating natural spawning conditions of April–May |
| Egg Incubation | Salinity: 0 ppt–10 ppt |
| | Temperature: 18–22° C. |
| | Dissolved $O_2$ (DO): >5 ppm |
| | Photoperiod Regime: no photoperiod requirement |
| Larval rearing | Temperature: 18–22° C. |
| | Salinity: 2–4 ppt |
| | Photoperiod regime: 12–16 hr light/12–8 hr dark |
| | Diet and Green Water Conditions: "green water" environment and a diet of enriched foods including live foods |
| Nursery | Temperature: 13–22° C. |
| | Salinity: 4–20 ppt |
| | Photoperiod regime: light exposure simulative of a natural wild environment |
| Grow-out | Salinity: 4 –20 ppt |
| | Temperature: 18–26° C. |
| | Dissolved $O_2$ (DO): >3 ppm |
| | Population density: variable density up to 60 kilograms/$m^3$ |
| | Water exchange: 24 tank volumes/hr |
| | Photoperiod regime: 15–17 hr light exposure per day in a daily photoexposure cycle |
| | Feeding: 6–25 times/day of pelleted commercial diet, |

TABLE D-continued

| LIFE CYCLE STAGE | PROCESS CONDITIONS |
|---|---|
| | with fish fed a percentage of their body weight, and with percentage varied as fish increase in size<br>pH: 7.4–7.8 |

As used herein, aquaculture process densities, in terms of weight per cubic meter, refers to the weight of the fish or the fish precursor species (fry, juveniles, etc.) per meter$^3$ of volume of the tank containing fish or fish precursor species in the aqueous medium.

Other aspects, features and embodiments of the invention will be more fully apparent from the ensuing disclosure and appended claims.

DETAILED DESCRIPTION OF THE INVENTION, AND PREFERRED EMBODIMENTS THEREOF

The present invention relates to a recirculating marine aquaculture process for producing an optimal output of fish.

The recirculating marine aquaculture process system of the invention is adapted for achieving optimal yield of fish species at variable density grow-out conditions, e.g., at a fish density in the grow-out process of up to 60 kilograms fish per meter$^3$ of the aquaculture medium.

The specific density of fish production achieved in application of the process of the invention depends on the particular fish species being cultured. The invention contemplates low-intensity grow-out of fish, in which fish yields may for example be below 25 kg/m$^3$ of the grow-out tank volume containing aqueous medium, e.g., in a range of 15–30 kg/m$^3$, as well as high-intensity grow-out operations, in which fish yields may for example be in a range of 40–50 kg/m$^3$ of the grow-out tank volume containing aqueous medium, or even higher, e.g., up to 60 kg/m$^3$.

The process of the invention includes (i) broodstock conditioning, (ii) spawning, (iii) egg incubation, (iv) larval growth, (v) nursery post-larval growth, and (vi) grow-out of fish to a final product weight, in a closed, recirculating aquaculture system in which photoperiod, water temperature, water chemistry (1) photoperiod, (2) water temperature, and (3) water chemistry (salinity, dissolved oxygen, ozone level, pH, etc.), and diet are optimized and then continuously monitored and controlled for the particular marine species, to obtain optimal production at each of the six phases (i)–(vi) of the life cycle.

The process of the invention, as a result of its low waste production characteristics and its amenability to use of municipal water as a source of aqueous media for marine aquaculture processing, permits commercial fish-farming operations to be conducted in urban environments and similar locations where deployment of aquaculture production facilities has heretofore not been commercially practicable.

While the invention is sometimes herein illustratively described in specific reference to Gilthead seabream (*Sparus aurata*) as a short photoperiod spawning species and to striped bass (*Morone saxatilis*) as a long photoperiod spawning species, it will be recognized that the invention and its systemic and process aspects are broadly applicable to aquaculture production of a wide variety of marine finfish species.

Illustrative fish varieties contemplated by the invention include, without limitation, gilthead seabream (*Sparus aurata*), haddock, reedfish (*Calamoichthys calabaricus*), sturgeon (*Acipenser transmontanus*), snook (*Centropomus undecimalis*), black sea bass (*Centropristis striata*), masu salmon, Atlantic salmon, rainbow trout, monkfish, sole, perch, tilapia, flounder, mahi mahi, striped bass, shad, pike, whitefish, swordfish, red snapper, baramundi, turbot, red drum, etc.

The recirculated aquaculture system, while amenable to embodiment in various specific forms, typically comprises an assembly of tanks each containing an aqueous medium for a specific stage of the aquaculture process (broodstock conditioning, spawning, egg incubation, larval rearing, nursery rearing, and grow-out), with ancillary solids removal filters, biofilters having associated active microbial communities, oxygen (or oxygen-containing gas) sources, and automatic control unit(s) for monitoring and control of oxygen, salinity, temperature, photoexposure, pH and carbon dioxide in respective tanks of the aquaculture process system. The aquaculture process system may also include optional ancillary facilities, such as ozonation/disinfection units, foam fractionation (foam breaker or defoaming) units, brine generator units, automatic feeder units, biopsy facilities, harvesting/packaging facilities, etc.

The process of the present invention permits continuous culturing of fish in a high-rate growth operation to produce fish of market size in a greatly compressed time-frame, relative to conventional fish-farming operations.

For example, the growth rate enhancement is concomitantly facilitated by a photoregime that in the grow-out phase substantially exceeds light exposure of the natural environment. By such light exposure regimen, conditions are avoided that promote gonadal development. This in turn relates to a subtle facet of bioenergetics involving consumption and utilization of energy by the fish species. By utilizing a light exposure (photoexposure regime) that disfavors the gonadal development process, the process of the present invention avoids the dissipation of energy that would otherwise be expended in testicular and ovarian development of the finfish, so that such energy instead is devoted to muscle/flesh development and weight-gain of the fish.

As another example, when culturing marine finfish in accordance with the invention, it has unexpectedly been found that the salinity of the aqueous medium in the grow-out phase can be markedly reduced below the levels that are characteristic of the natural marine environment of such fish, without adverse effect on the growth and development of the fish, and that in fact fish raised in such low salinity synthetic environments unexpectedly grow substantially faster than their counterparts raised in seapens or other environments that embody or mimic the natural marine environment of the fish species.

Further, such improvements have been found to be achievable with a synthetic brine derived from a chlorinated municipal water starting material that is de-chlorinated, e.g., by contact with activated carbon, and then employed to synthesize a low salinity aqueous medium, by addition to the de-chlorinated aqueous medium of suitable salts, minerals and trace element species, e.g., NaCl, KCl, Mg, Sr, Li, etc.

One such aqueous medium usefully employed in the practice of the invention comprises the composition identified in Table E below, wherein the components, purity, concentration, weight added, and percentage by weight (based on the total weight of the composition, exclusive of the top-off filtered freshwater) are as specified.

TABLE E

AQUEOUS MEDIUM COMPOSITION FOR AQUACULTURE SYSTEM

| Chemical Reagent | Purity | Conc. (g/L) | Amount (kg) | % by weight, based on total weight |
|---|---|---|---|---|
| Magnesium Chloride | 95.0% | 6.8900 | 54.184 | 20.02% |
| Calcium Chloride | 80.0% | 1.2597 | 11.764 | 4.35% |
| Potassium Chloride, potash, fine) | 99.9% | 0.6552 | 4.900 | 1.81% |
| Strontium Chloride | 100.0% | 0.0150 | 0.112 | 0.04% |
| Lithium Chloride | 99.0% | 00011 | 0.00830 | 0.00% |
| Sodium Sulfate, (Anhydrous) | 100.0% | 2.5302 | 18.903 | 6.98% |
| Magnesium Sulfate, (epsom salts) | 100% | 1.8704 | 13.974 | 5.16% |
| Sodium tetraborate, (Borax) | 100.0% | 0.0399 | 0.298 | 0.11% |
| Sodium molybdate | 99.0% | 0.000013 | 0.000097 | 0.00% |
| Sodium Carbonate, (soda ash) | 100.0% | 0.0600 | 0.448 | 0.17% |
| Sodium Bicarbonate, (baking soda) | 100.0% | 0.2300 | 1.718 | 0.63% |
| Sodium Chloride, saturated brine | 100.0% | 21.9980 | 164.345 | 60.72% |
| Top off with filtered freshwater to volume | | | | |
| total amount | | | 270.65 | 100.00% |

The above-tabulated composition specifies the ingredients for an illustratively sized batch of the aqueous medium useful in the process of the present invention. The salinity of such aqueous medium may be modulated as desired, by the amount of filtered freshwater that is introduced during formulation of the aqueous medium composition.

In one aspect of the present invention, wherein marine finfish are being cultured, the aqueous medium in at least the grow-out phase may comprise a "hyposaline" aqueous medium. As used herein, the term "hyposaline aqueous medium" refers to an aqueous medium having a salinity that is in a range of from about 5 to about 20 parts per thousand (ppt). Such hyposaline aqueous medium therefore has a salinity that is significantly below the salinity of natural oceanic marine waters (typically 30–35 ppt) to which the marine finfish is native.

The foregoing aspects of the invention relating to the water source and the aqueous medium made therefrom evidence a number of unexpected facets.

It is highly surprising that a synthetic low salinity aqueous medium would be conducive to an enhanced rate of growth of the marine finfish, since it is anticipated that the aqueous medium most conducive to high rate growth of fish would be the marine environment to which the fish have become evolutionarily adapted, namely, their natural (high) salinity marine environment.

While we do not wish to be bound by any theory or hypothesis as to the reason for the enhanced growth rate of finfish in such synthetic low salinity environments, the observed phenomena may be susceptible to bioenergetic explanation. In a high salinity environment such as the ocean, marine fish require physiological energy to accommodate ion channel transport and maintain internal osmotic stability relative to ionic (salt, mineral) species in the marine environment. By using a low salinity aqueous medium in the grow-out phase, the energy requirements otherwise associated with such ionic transport and maintenance of osmotic stability are lessened, with correlative increase in the level of biological energy that is available for cellular and muscular growth.

In addition to the above, the recirculating aquaculture medium at high volumetric turn-over flow rates, e.g., in a range of from about 1.5 to about 5 tank volumes/hr, as contemplated in a preferred aspect of the invention, serves to prevent or at least minimize occurrence of anaerobiasis in the biofilter that preferably is associated with the aquaculture grow-out tank. Recirculating the aqueous medium at high turn-over rate also increases the mass transfer gradient for dissolution of oxygen in the aqueous medium, so that oxygenation of the aqueous medium is enhanced in efficiency. Further, the contact of the aqueous medium with the microbial flora in the biofilter under the high rate recirculation conditions allows efficient removal of ammonia.

The recirculating marine aquaculture process of the invention thus enables a remarkable improvement in the production of finfish to be achieved. As a result, the process of the invention permits the growth and harvesting of marine finfish in a fraction of the time conventionally required, and such improvement is achieved with significant improvement in process economics.

The recirculated marine aquaculture process system including broodstock conditioning, spawning, egg incubation, larval rearing, nursery processing, and grow-out tanks, and ancillary feed, waste treatment/disposal, and monitoring/support facilities, may be housed in a dedicated building or other structure. The ability of the process to utilize municipal water permits the aquaculture system to be sited in urban or suburban areas, where transportation and infrastructure costs for support of the facility are significantly lower than in other areas traditionally considered for fish-farming operations.

Further, the high volumetric efficiency of the aquaculture process and system of the invention, and its low rate of net waste production (which is of a volume and character accommodating on-site treatment for effluent discharge), enable the aquaculture facility to be sited even in areas having strict environmental impact constraints.

It will therefore be appreciated that the invention may be readily practice in a variety of embodiments, including those variously parametrically specified in Tables A, B, C and D in the Summary of the Invention section hereof, for producing market weight fish at densities up to 60 kilograms fish per cubic meter of the grow-out tank containing aqueous medium in the aquaculture system.

In the grow-out phase, high growth rate fish production is achieved, using high-rate feeding, extended photoexposure, and high-rate intra-system flows (volumetric exchanges of the grow-out tank) of hyposaline aqueous medium. The hyposaline aqueous medium is readily made up from chlorinated municipal source water after de-chlorination thereof, e.g., by carbon filtration.

The tanks that are used to contain the aqueous medium in carrying out the process of the invention may be of any suitable type, preferably being constructed of a corrosionresistant material. The tanks may be covered to retard evaporation, or uncovered, as necessary or desirable in a given application of the invention.

The salinity of the aqueous medium in the tanks may be adjusted to the proper level using an electrochemical monitoring device such as a salinity probe and associated controls, or other of various suitable means known in the art for maintaining salinity at a desired value or within a predetermined operating range.

The tanks are provided as necessary with a photoexposure system. For example, a photoexposure light source such as a lamp may be associated with a process tank and coupled to a suitable power supply. The lighting system alternatively may comprise an arrangement of multiple lamps or illumination elements, e.g., mounted on the underside of a cover of a tank, or otherwise suspended in the tank headspace or above the tank, overlying the aqueous medium therein. The lighting system may be widely varied in make-up and operation, to provide a requisite light intensity, flux and other spectral characteristics, as suitable to the fish species being grown.

The power supply associated with the lighting system in turn may be coupled to a monitoring and control module for the aquaculture system, with electrical power supplied to light source element(s) according to a suitable cycle time program. The cycle time program may be stored in the memory of a central processing unit (CPU) of the monitoring and control module, to provide illumination of the contents of the tank as desired.

Such monitoring and control module may be arranged to variably control the light to which the contents of the tank are exposed, specifically regulating the light intensity and the length of the photoperiod (the period of light exposure).

The monitoring and control module may also be arranged to monitor and control other parameters of system operation, such as the water (aqueous medium) temperature, dissolved oxygen (DO) content of the water, pH of the water, feed (nutrient) dispensing, green water algal conditions, salinity, water flow rates into and out of the tank, etc., by appropriate coupling of the module with monitoring and control elements such as dissolved oxygen probes, thermocouples, pH sensors, flow monitors, flow control valves, salinity detectors, oxygen feed devices, acid/base dispensers, automated food dispensers, etc.

In operation of the aquaculture process system, aqueous medium may be pumped from the aquaculture tank by a system pump in a recirculation loop or flow circuit, for treatment outside the tank. For example, aqueous medium may be flowed from the tank to a filtration unit, such as a bead filter tank, in which suspended solids in the water are trapped by bead filtration media and removed from the aqueous medium.

Such filtration unit may for example be arranged to remove particulates having a particle size >20 microns. The bead filter is advantageously provided with electronic controls to effect periodic backflushing of the filter, e.g., cycle timer controls for backflushing at predetermined intervals, solids monitoring devices such as turbidity sensors, and/or other automated control means, the provision of which is within the skill of the applicable art.

The filtration unit removes sediment, and may have associated therewith a protein skimmer, to remove proteinaceous material floating to the top of the filtration tank.

In lieu of, or in addition to, bead filters, numerous other types of mechanical filters can be employed for solids removal, such as membrane filters, sedimentation chambers, clarifiers, centrifugal solids separators, filter presses, etc.

Upon completion of mechanical filtration, filtered water (filtrate) from the mechanical filter then may be flowed to a moving bed biofilter for nitrification under aerobic conditions, so that the ammonia ($NH_3$) or $N_4^+$ present in the aqueous medium is converted to $NO_2$ and then to $NO_3$), with optional subsequent denitrification in a denitrification biofilter under anaerobic conditions. After optional denitrification, the aqueous medium can be re-oxygenated to provide a suitable level of dissolved oxygen therein, e.g., a concentration of at least 3 ppm, and preferably 3–7 ppm. The resultant treated water is recirculated to the aquaculture tank.

In the recirculation loop, water discharged from the filter can be selectively heated or cooled as necesary to maintain the aquaculture medium at a given temperature in the associated aquaculture tank. For example, such aqueous medium may be flowed to a heat exchanger, such as a shell-and-tube heat exchanger, in which the circulated aqueous medium is heated or cooled, as appropriate, by a heat exchange liquid, e.g., a glycol/water solution. The heat exchange liquid may be circulated through the passages of the heat exchanger from a source vessel, in which the liquid is maintained at a desired temperature, as necessary for the desired heat exchange heating or cooling of the aqueous medium.

In such manner, the water in the aquaculture tank can be maintained at a desired temperature appropriate to the specific fish species being grown in the process system.

In the recirculation flow circuit, a side stream loop may advantageously be provided, including a pump that is operated to flow the aqueous medium through a treatment unit in which dissolved organic species are removed by contact with ozone or oxygen. Such treatment unit optionally may be equipped with a protein skimmer, to remove floating proteinaceous matter from the surface of the liquid in the associated treatment unit tank(s). The treated water then may be flowed through a polishing chamber arranged for ion exchange, pH adjustment, and/or other treatment of the recycled aqueous medium, prior to its return to the aquaculture tank.

Overflow from any of the filters or tanks as well as waste solids from the filters in the aquaculture process system may be flowed to a waste tank where water and solids are treated with a disinfecting agent, such as chlorine or the like. The disinfected overflow/solids then may be discharged from the aquaculture system, e.g., into a municipal sewage system, aeration pond, or other receiving waters, for final disposition.

Any source of filtered fresh water may be used to supply fresh (or make-up) water for the aquaculture process, such as well water, or alternatively river water after appropriate sterilization. If the fresh water source is chlorinated municipal water, the water desirably is first treated to remove chlorine therefrom, e.g., by passage through a multi-sand medium and then activated carbon.

The aquaculture process facility may include fresh water and salt water storage for the aqueous medium used in the process. Salt water may be produced in the aquaculture facility using a brine generator, with trace mineral introduction and saltwater mixing in a mixing chamber, e.g., to form a saline aqueous medium at the salinity of natural seawater, or higher. The resultant saline aqueous medium then can be used in the process, at full strength or in diluted (hyposaline) form, as may be variously desired in the respective steps of the aquaculture process.

The aquaculture system may comprise appropriate flow circuitry in the form of pipes, conduits, manifolds, flow control valves, restricted flow orifice elements, valve actuators and controllers (which may be of any appropriate type, including elements such as pneumatic actuators, electromechanical actuators, solenoid valves, etc.) and the flow circuitry may include or be operatively coupled to a central controller unit or assembly.

In operation, the aqueous medium from the aquaculture tank preferably is circulated in a closed recirculation loop to an aqueous medium treatment complex (e.g., comprised of equipment such as bead filters, biofilters, ozonation units, protein skimmers, etc.) and recirculated to the aquaculture tank after treatment in the exterior recirculation loop.

In this manner, the process system is advantageously arranged to provide a desired volumetric turn-over frequency of the aqueous medium in the operation of the system, with flow from the aquaculture tank through the associated liquid recirculation loop and back to the aquaculture tank, with waste removal and make-up water addition as required. By appropriate arrangement of the recirculation loop and component pump(s), an appropriate turnover rate of the aquaculture tank liquid volume may be effected for the specific operation being carried out in such tank. For example, the process can be operated to replenish the entire volume of water in the aquaculture tanks at a rate in a range of from about 1.5 to to about 5 times an hour, e.g., 2 to 4 times an hour, or 3 to 4 times an hour, as may be desired in various illustrative embodiments.

The liquid recirculation loop associated with the aquaculture tank desirably includes a biofilter, preferably containing microbial support media in a moving bed filter that is maintained in suspension in the tank liquid. Liquid circulation in the biofilter may be effected by diffusing air through a porous element, such as a rubber disk membrane, to cause the microbial support media to tumble and mix. The injection of gas and resultant gas-induced mixing provides increased contact between the microbial communities in the biofilter and the various dissolved metabolites. This in turn increases the cleansing action of the biofilter in treating the large volumes of water that are recirculated in the aquaculture system to achieve high efficiency operation.

Each aquaculture tank in the aquaculture process system preferably is computer monitored to control temperature, pH, dissolved oxygen, salinity, flow rates, light intensity and length of photoperiod at specific preferred optimal values or in specific optimal ranges, as appropriate to the particular aquaculture process and fish species involved. In the biofilters, monitoring advantageously is carried out to maintain microbial flora on the biofilter substrate elements in populations appropriate to high-rate purification of the aqueous medium in the high flow rate recirculation loop.

For such purpose, appropriate sensing, monitoring and control elements may be interconnected with a CPU or other computer or automatic controller/monitoring unit, to provide an integrated monitoring and control module, e.g., for monitoring and controlling process parameters such as flow rates, photoexposure, dissolved oxygen concentration, temperature, pH, etc., and/or for effecting process operations, such as backwashing of system filters, filling/emptying of process tanks, dispensing of feed/nutrient material, actuating heating/cooling systems, etc.

In the broodstock conditioning tank of the process, the broodstock are conditioned for spawning and reproduction in an aqueous medium of appropriate temperature, population density, photoregime and salinity conditions. The broodstock in preparation for spawning may, if necessary, by administered gonadotropin-releasing hormone (GnRH) or a gonadotropin-releasing hormone agonist (GnRHa) in a sustained released dose form, at an appropriate sex-adjusted dosage for the male and female broodstock.

In one embodiment of the aquaculture process of the invention, groups of fish are advantageously "phase-shifted" in the years prior to spawning (i.e., the photoperiod, temperature and salinity regimes are manipulated for groups of fish, so that the photoexposure for spawning is temporally shifted for staggered spawning seasons), to thereby enable year-round spawning.

During the spawning period of the fish species involved, viable eggs are gathered and placed in an incubation tank at a suitable density, with water temperature and salinity maintained at appropriate levels. The aqueous medium in the incubation tank is aerated and subjected to water exchange during the incubation period.

Egg density is maintained at a predetermined level in the incubation tank, with ammonia levels in the aqueous medium being kept to low values to avoid toxicity issues.

After hatching, the larvae are administered nutrients, e.g., n-3 fatty acid-enriched rotifers (*Brachionus pliccatilis*) and algae (Nannochloropsis sp.), followed by *Artemia nauplii*, at concentrations ensuring optimal density of the larvae, as adjusted daily or otherwise periodically for optimal results, with larvae cannibalism and mortality due to predation being minimized by maintaining size homogeneity of the larvae. Fifteen days after hatching, the larvae are offered newly hatched *Artemia nauplii* for three days.

Enriched diets of live foods for larval rearing may advantageously utilize various suitable types of live prey, e.g., brine shrimp, enriched with fatty acids. Green water conditions and enriched diets are beneficially employed to provide a balanced microenvironment and continuous food for the larvae.

The post-larvae/fry are graded by size prior to being introduced to the nursery tank, and are weaned from their prior diet to a formulated microdiet, with food size being increased to match larval size.

In the nursery tank, lighting exposure is controlled to provide an appropriate photoregime for nursery growth of the fry to a size suitable for the final grow-out process. In addition to controlling the light intensity and length of the photoperiod, monitoring and automatic control facilities desirably are employed to regulate temperature, dissolved oxygen content, pH and water flow rates in the nursery process.

The aqueous medium in the nursery process may be recirculated as previously described, in a recirculation flow circuit including filtration (mechanical and biological) means arranged to accommodate the high turnover volumetric flows in the nursery process.

Fry are raised in the nursery tanks until they reach a predetermined size, and juveniles then are moved into large grow-out tanks.

In the grow-out tank, fish are grown from juveniles to market weight. The tanks in the grow-out process are suitably arranged with a lighting system and appropriate monitoring and control means to regulate light intensity and the length of the photoperiod, water temperature, dissolved oxygen concentration, pH and water flow rates.

The aqueous medium in the grow-out process may be recirculated in a flow circuit as previously described, being subjected to biological and mechanical filtration, removal of protein and dissolved organics, heating/cooling, etc.

In the entire process, electronic controls may be employed for back-flushing filters, for monitoring and controlling flow rates, dissolved oxygen concentration, temperature, pH, etc., using a microprocessor or computer system. Waste comprising overflow and solids sedimented or backwashed from the filters may be processed by disinfection and final discharge to sewer or other disposition or treatment, as previously described.

The volume of the grow-out tanks may be of any appropriate size as regards the volumetric needs of the aquaculture facility, e.g., in a range of from about 10 cubic meters to 200 cubic meters, with tankage volumes in a range of from about 20 to about 100 cubic meters being preferred. Controlled feeding techniques minimize the grow-out time. Fish are periodically graded (separated according to size). The fish are harvested and marketed when they are of appropriate adult size.

In various of specific embodiments, the present invention contemplates production of fish that spawn under short photoperiod conditions, e.g., gilthead seabream (*Sparus aurata*), under conditions as described in Table A herein, or, in a further aspect, under the conditions described in Table C herein.

In various other specific embodiments, the present invention contemplates a process for producing fish that spawn under long photoperiod conditions, e.g., striped bass (*Morone saxatilis*), under conditions as described in Table B herein, or, in a further aspect, under the conditions described in Table D herein.

In optimal operation, the aquaculture process of the invention is conducted with less than 10% daily water exchange (daily water exchange meaning the water that is introduced to the aquaculture system as net make-up, and the water that is discharged from the system as net effluent to the waste disposal system). The aquaculture process system in such respect is a "closed" recirculating aquaculture system, since the net exchange of water with the external environment during normal operation of the system is extremely low. Such low level of net water consumption is enabled by the recirculated and continuously purified character of the water. The net waste generation is minimized, and net waste produced in the operation of the facility can be readily accommodated by local sewer, septic and wastewater treatment facilities.

It will be apparent to those skilled in the art that various modifications and variations can be made in the recirculating marine aquaculture process of the present invention without departing from the spirit or scope of the invention as hereinafter claimed. It will therefore be appreciated that numerous variations, modifications and other embodiments are contemplated, as being within the spirit and scope of the invention hereinafter claimed.

What is claimed is:

1. A closed, recirculating marine aquaculture process for production of a marine fish species, including life-cycle stages of (i) broodstock conditioning, (ii) spawning, (iii) egg incubation, (iv) larval growth, (v) nursery post-larval growth, and (vi) grow-out of fish to a final product weight, wherein each respective life-cycle stage (i)–(vi) of the process involves operation in an aqueous medium that is coupled in liquid recirculation relationship with means for removing waste components from the aqueous medium and returning purified aqueous medium to the external environment, and wherein photoperiod, water temperature, water chemistry, and diet are optimized and then continuously monitored and controlled for the specific marine fish species, to obtain optimal production at each of the six life-cycle stages (i)–(vi).

2. The process of claim 1, wherein the marine fish species is a short photoperiod spawning species.

3. The process of claim 1, wherein the marine fish species is a long photoperiod spawning species.

4. The process of claim 1, wherein the marine fish species is selected from the group consisting of gilthead seabream (*Sparus aurata*), haddock, reedfish (*Calamoichthys calabaricus*), sturgeon (*Acipenser transmontanus*), snook (*Centropomus undecimalis*), black sea bass (*Centropristis striata*), masu salmon, Atlantic salmon, rainbow trout, monkfish, sole, perch, tilapia, flounder, mahi mahi, striped bass, shad, pike, whitefish, swordfish, red snapper, baramundi, turbot, and red drum.

5. The process of claim 1, wherein the marine fish species is selected from the group consisting of seabream, striped bass, tilapia, barramundi, flounder, turbot, seabass, red snapper, red drum and salmon.

6. The process of claim 1, wherein the marine fish species is gilthead seabream (*Sparus aurata*).

7. The process of claim 1, wherein the marine fish species is striped bass (*Morone saxatilis*).

8. The process of claim 1, wherein the grow-out life-cycle stage is operated to produce market weight fish at a density of up to 60 kilograms of fish/$m^3$ aqueous medium.

9. The process of claim 1, including the steps of:

providing recirculated aqueous medium tanks for populations in the life-cycle stages;

continuously recirculating aqueous medium and treating the aqueous medium for removal of waste therefrom;

admininstering, as needed, gonadotropin-releasing hormone (GnRH) or GnRH agonist to a broodstock population of said marine fish prior to spawning; and maintaining process conditions in the aqueous medium in respective life-cycle stages, in accordance with the following PROCESS CONDITIONS correlative to LIFE-CYCLE STAGE:

TABLE F

| LIFE CYCLE STAGE | PROCESS CONDITIONS |
| --- | --- |
| Broodstock conditioning | Salinity: 15 ppt–40 ppt |
| | Temperature: 15–22° C.<br>Dissolved $O_2$ (DO): >3 ppm<br>Population Density: 10–30 kg/$m^3$<br>Photoperiod and Thermal Regimes:<br>simulated natural photoperiod and thermal regimes<br>simulating natural environmental conditions<br>Diet: Fish are fed 1–3 times daily with 1–1.5% per<br>kg body weight, per day, of feed including<br>protein and marine lipids |

TABLE F-continued

| LIFE CYCLE STAGE | PROCESS CONDITIONS |
| --- | --- |
| Spawning | Salinity: 15–40 ppt<br>Temperature: 15–24° C.<br>Dissolved $O_2$ (DO): >3 ppm<br>Population density: 10–30 kilograms/$m^3$<br>Photoperiod regime: short days, with increasing daylight of 6–12 hr light, and decreasing darkness of 18–12 hr dark, with transitions between light/dark periods of 45 minutes to 1 hour and 15 minutes, with conditions culminating in photoperiod simulating natural spawning conditions of December–April (daylight must be increasing, albeit the overall length of the day is still short at spawning).<br>Diet: polyunsaturated fatty acid (n3/n6) rich diet |
| Egg Incubation | Salinity: 15 ppt–40 ppt<br>Temperature: 15–22° C.<br>Dissolved $O_2$ (DO): >5 ppm<br>Population density: from about 75 to about 150 eggs/liter volume; egg incubation period is from about 36 to about 48 hr<br>Photoperiod regime: no photoperiod requirement |
| Larval rearing | Salinity: 15 ppt–40 ppt<br>Temperature: 15–22° C., occurring in a gradual increase concurrent with larval development<br>Dissolved $O_2$ (DO): >5 ppm; maintenance of ammonia <0.2 mg ammonia per liter of aqueous medium<br>Population Density: from about 75 to about 150 eggs/liter volume<br>Photoperiod regime: 12–16 hr light/12–8 hr dark<br>Diet and Green Water Conditions:<br>enriched rotifers followed by enriched artemia |
| Nursery | Salinity: 15 ppt–40 ppt<br>Temperature: 17–30° C.<br>Dissolved $O_2$ (DO): >3 ppm<br>Population density: 10–20 fry/liter of tank, subject to a maximum of 1500 individuals/$m^3$<br>Photoperiod regime: 15–17 hr of light exposure per day<br>Diet: Weaning from live food to formulated diet |
| Grow-out | Salinity: 5–40 ppt<br>Temperature: 17–30° C.<br>Dissolved $O_2$ (DO): 4–6 ppm<br>Population density: variable density up to 60 kilograms/$m^3$<br>Water exchange: 24 tank volumes/hr.<br>Photoperiod regime: 16–20 hr light exposure per day, optionally with about 1 hour of increasing light intensity from darkness to light exposure and optionally with about 1 hour of decreasing light intensity from light exposure to darkness<br>Feeding: 6–25 times/day of pelleted commercial diet, with fish fed a percentage of their body weight, and with percentage varied as fish increase in size<br>pH: 7.4–7.8 |

10. The process of claim 9, wherein the marine fish species is gilthead seabream (*Sparus aurata*).

11. The process of claim 9, wherein in said broodstock conditioning stage, said feed comprises food selected from the group consisting of (i) squid meal-based dry pellets, comprising 50–55% protein and 10–15% marine-type lipids, wherein said lipids comprise at least 5% n-3 highly unsaturated fatty acids (HUFA), mainly of the 22:6n-3 (DHA) type, and (ii) dry commercial pellets, supplemented with 2–3% of chopped frozen squid.

12. The process of claim 11, wherein said feed selected from the group consisting of (i) and (ii) is fed to broodstock fish in said broodstock conditioning stage, starting at least 15 days before the initiation of spawning.

13. The process of claim 9, wherein the broodstock population comprises fish that are 2–6 years old.

14. The process of claim 9, wherein the broodstock conditioning tank has a volume in a range of from about 4 to about 20 $m^3$.

15. The process of claim 9, wherein the broodstock population at stocking of the broodstock conditioning tank has a sex ratio of males:females of substantially 1:1.

16. The process of claim 9, wherein age distribution of the broodstock population is regulated to avoid sex change of older males during broodstock conditioning.

17. The process of claim 9, wherein photoperiod, temperature and salinity are manipulated to yield out-of-season spawning.

18. The process of claim 9, wherein photoperiod, temperature and salinity are manipulated to yield year-round egg production.

19. The process of claim 9, wherein spawning is initiated by treating females and males with gonadotropin-releasing hormone agonist (GnRHa) delivery systems.

20. The process of claim 9, wherein GnRHa is administered in a sustained release form at a dose in a range of from about 25 to about 100 micrograms per kg body weight of females, and at a dose in a range of from about 15 to about 30 micrograms per kg of body weight of males.

21. The process of claim 9, wherein the salinity of the aqueous medium in the broodstock conditioning tank is about 30 ppt.

22. The process of claim 9, wherein the temperature of the aqueous medium in the broodstock conditioning tank is in a range of from about 18 to about 20° C.

23. The process of claim 9, wherein the salinity of the aqueous medium in the spawning tank is about 30 ppt.

24. The process of claim 9, wherein the temperature of the aqueous medium in the spawning tank is in a range of from about 18 to about 20° C.

25. The process of claim 9, wherein the salinity of the aqueous medium in the egg incubation tank is about 30 ppt.

26. The process of claim 9, wherein the salinity of the aqueous medium in the larval rearing tank is in a range of from about 25 to about 30 ppt.

27. The process of claim 9, wherein the temperature of the aqueous medium in the larval rearing tank is in a range of from about 18 to about 22° C.

28. The process of claim 9, wherein the temperature of the aqueous medium in the nursery tank is in a range of from about 20 to about 26° C.

29. The process of claim 9, wherein the salinity of the aqueous medium in the grow-out tank is in a range of from about 15 to about 25 ppt.

30. The process of claim 9, wherein the temperature of the aqueous medium in the grow-out tank is in a range of from about 20 to about 26° C.

31. The process of claim 9, wherein:
the salinity of the aqueous medium in the broodstock conditioning tank is about 30 ppt;
the temperature of the aqueous medium in the broodstock conditioning tank is in a range of from about 18 to about 20° C.;
the salinity of the aqueous medium in the spawning tank is about 30 ppt;
the temperature of the aqueous medium in the spawning tank is in a range of from about 18 to about 20° C.;
the salinity of the aqueous medium in the egg incubation tank is about 30 ppt;
the salinity of the aqueous medium in the larval rearing tank is in a range of from about 25 to about 30 ppt;
the temperature of the aqueous medium in the larval rearing tank is in a range of from about 18 to about 22° C.;
the temperature of the aqueous medium in the nursery tank is in a range of from about 20 to about 26° C.;
the salinity of the aqueous medium in the grow-out tank is in a range of from about 15 to about 25 ppt; and
the temperature of the aqueous medium in the grow-out tank is in a range of from about 20 to about 26° C.

32. The process of claim 1, including the steps of:
providing recirculated aqueous medium tanks for populations in the life-cycle stages;
continuously recirculating aqueous medium and treating the aqueous medium for removal of waste therefrom;
admininstering, as needed, gonadotropin-releasing hormone (GnRH) or GnRH agonist to a broodstock population of said marine fish prior to spawning; and
maintaining process conditions in the aqueous medium in respective life-cycle stages, in accordance with the following PROCESS CONDITIONS correlative to LIFE-CYCLE STAGE:

| LIFE CYCLE STAGE | PROCESS CONDITIONS | |
|---|---|---|
| Broodstock conditioning | Salinity: | 4 ppt–20 ppt |
| | Temperature: | 13–22° C. |
| | Dissolved O$_2$(DO): | >3 ppm |
| | Population Density: | 10–20 kg/m$^3$ |
| | Photoperiod and Thermal Regimes: | simulated natural photoperiod and thermal regimes simulating natural environmental conditions |
| | Diet: | Fish are fed 1–3 times daily with 1–1.5% per kg body weight, per day, of feed including protein and marine lipids |
| Spawning | Salinity: | 4–20 ppt |
| | Temperature: | 13–22° C. |
| | Dissolved O$_2$(DO): | >3 ppm |
| | Population density: | 10–20 kilograms/m$^3$ |
| | Photoperiod regime: | increasing days of 12–15 hr light, and decreasing darkness of 12–9 hr dark, with transitions between light/dark periods of 45 minutes to 1 hour and 15 minutes, with conditions culminating in photoperiod simulating natural spawning conditions of April–May |
| Egg Incubation | Salinity: | 0 ppt–10 ppt |
| | Temperature: | 18–22° C. |
| | Dissolved O$_2$(DO): | >5 ppm |
| | Population density: | in the range of from about 1500 to about 2500 eggs/liter volume |
| | Photoperiod regime: | no photoperiod requirement |
| Larval rearing | Salinity: | 2 ppt–4 ppt |
| | Temperature: | 18–22° C. |
| | Dissolved O$_2$(DO): | >5 ppm |
| | Population Density: | from about 75 to about 150 larvae/liter volume |
| | Photoperiod regime: | 12–16 hr light/12–8 hr dark |
| | Diet and Green Water Conditions: | enriched rotifers followed by enriched artemia |
| Nursery | Salinity: | 4 ppt–20 ppt |
| | Temperature: | 13–22° C. |
| | Dissolved O$_2$(DO): | >3 ppm |
| | Population density: | maximum of 1500 individuals/m$^3$ |
| | Photoperiod regime: | light exposure simulative of a natural wild environment |
| | Diet: | Weaning from live food to formulated diet |
| Grow-out | Salinity: | 4–20 ppt |
| | Temperature: | 18–26° C. |
| | Dissolved O$_2$(DO): | >3 ppm |
| | Population density: | variable density up to 60 kilograms/m$^3$ |
| | Water exchange: | 2–4 tank volumes/hr. |
| | Photoperiod regime: | 15–17 hr light exposure per day |
| | Feeding: | 6–25 times/day of pelleted commercial diet, with fish fed a percentage of their body weight, and with percentage varied as fish increase in size |
| | pH: | 7.4–7.8 |

33. The process of claim 32, wherein the marine fish species is striped bass (*Morone saxatilis*).

34. The process of claim 32, wherein in said broodstock conditioning stage said feed comprises food selected from the group consisting of (i) squid meal-based dry pellets, comprising 50–55% protein and 10–15% marine-type lipids, wherein said lipids comprise at least 5% n-3 highly unsaturated fatty acids (HUFA), mainly of the 22:6n-3 (DHA)

type, and (ii) dry commercial pellets, supplemented with 2–3% of chopped frozen squid.

35. The process of claim 32, wherein said feed selected from the group consisting of (i) and (ii) is fed to broodstock fish in said broodstock conditioning stage, starting at least 15 days before the initiation of spawning.

36. The process of claim 32, wherein the broodstock population comprises fish that are at least 3 years old.

37. The process of claim 32, wherein the broodstock population comprises fish that are 3–10 years old.

38. The process of claim 32, wherein the broodstock conditioning tank has a volume in a range of from about 4 to about 20 m$^3$.

39. The process of claim 32, wherein the broodstock population at stocking of the broodstock conditioning zone has a sex ratio of males:females of substantially 1:1 or substantially 1:2.

40. The process of claim 32, wherein photoperiod, temperature and salinity are manipulated to yield out-of-season spawning.

41. The process of claim 32, wherein photoperiod, temperature and salinity are manipulated to yield year-round egg production.

42. The process of claim 32, wherein spawning is initiated by treating females and males with gonadotropin-releasing hormone agonist (GnRHa) delivery systems.

43. The process of claim 32, wherein the salinity of the aqueous medium in the broodstock conditioning tank is in a range of from about 8 to about 10 ppt.

44. The process of claim 32, wherein the temperature of the aqueous medium in the broodstock conditioning tank is in a range of from about 14 to about 18° C.

45. The process of claim 32, wherein the salinity of the aqueous medium in the spawning tank is in a range of from about 8 to about 10 ppt.

46. The process of claim 32, wherein the temperature of the aqueous medium in the spawning tank is in a range of from about 18 to about 21° C.

47. The process of claim 32, wherein the salinity of the aqueous medium in the egg incubation tank is in a range of from about 2 to about 4 ppt.

48. The process of claim 32, wherein the temperature of the aqueous medium in the egg incubation tank is about 22° C.

49. The process of claim 32, wherein the temperature of the aqueous medium in the grow-out tank is in a range of from about 20 to about 24° C.

50. The process of claim 32, wherein:
the salinity of the aqueous medium in the broodstock conditioning tank is in a range of from about 8 to about 10 ppt;
the temperature of the aqueous medium in the broodstock conditioning tank is in a range of from about 14 to about 18° C.;
the salinity of the aqueous medium in the spawning tank is in a range of from about 8 to about 10 ppt;
the temperature of the aqueous medium in the spawning tank is in a range of from about 18 to about 21° C.;
the salinity of the aqueous medium in the egg incubation tank is in a range of from about 2 to about 4 ppt;
the temperature of the aqueous medium in the egg incubation tank is about 22° C.; and
the temperature of the aqueous medium in the grow-out tank is in a range of from about 20 to about 24° C.

51. The process of claim 1, wherein the aqueous medium in the grow-out stage is a hyposaline aqueous medium.

52. The process of claim 1, wherein the marine fish species is subjected to a photoregime in the grow-out stage that substantially exceeds light exposure of the marine fish species in its natural environment.

53. The process of claim 1, wherein the aqueous medium has a composition according to Table E.

54. The process of claim 1, wherein the aqueous medium comprises water from a municipal chlorinated water source that has been de-chlorinated by treatment comprising contacting of the water with activated carbon sorbent.

55. A process for producing fish, by cultivation in life-cycle stages including broodstock conditioning, spawning, egg incubation, larval rearing, nursery processing, and grow-out, in a closed, continuous recirculation aquaculture system adapted to culture corresponding populations of broodstock, eggs, larvae, fry and fish in aqueous media, wherein photoperiod, water temperature, water chemistry, and diet are optimally maintained in the life-cycle stages to achieve optimal production in such life-cycle stages.

56. A process for producing short photoperiod spawning marine fish in a closed, recirculating aquaculture system including respective aqueous medium-containing tanks for successive life-cycle stages, including broodstock conditioning, spawning, egg incubation, larval rearing, nursery processing and fish grow-out, wherein photoperiod, water temperature, water chemistry and diet are monitored and controlled to provide regulated process conditions in the aqueous medium tanks including the PROCESS CONDITIONS correlative to LIFE-CYCLE STAGE set forth in Table C.

57. A process according to claim 56, wherein said fish is gilthead seabream (*Sparus aurata*).

58. A process for producing long photoperiod spawning marine fish in a closed, recirculating aquaculture system including respective aqueous medium-containing tanks for successive life-cycle stages, including broodstock conditioning, spawning, egg incubation, larval rearing, nursery processing and fish grow-out, wherein photoperiod, water temperature, water chemistry and diet are monitored and controlled to provide regulated process conditions in the aqueous medium tanks including the PROCESS CONDITIONS correlative to LIFE-CYCLE STAGE set forth in Table D.

59. A process according to claim 58, wherein said fish is striped bass (*Morone saxatilis*).

60. A process of grow-out of a marine finfish in an aqueous medium, including the steps of:
(g) culturing the marine finfish in a culture tank coupled in liquid recirculation flow relationship with a biofilter and mechanical filter maintained under aerobic microbial conditions;
(h) continuously circulating aqueous medium through the culture tank and the biofilter and mechanical filter coupled therewith, to remove nitrogenous wastes and solids from the aqueous medium and produce a filtered aqueous medium for recirculation to the culture tank;
(i) maintaining a circulation rate of the continuously circulating aqueous medium producing from about 1.5 to about 5 volumetric changes of the culture tank per hour;
(j) maintaining dissolved oxygen of at least 4–6 ppm in the aqueous medium in the culture tank;
(k) exposing marine finfish in the culture tank aqueous medium to a cyclic alternating light/darkness photoregime whose light period substantially exceeds duration of light exposure in a wild marine environment of said marine finfish; and (l) utilizing a hyposaline aqueous medium as the aqueous medium.

61. A method of producing marine fish at a variable yield density of up to 60 kilograms fish per cubic meter of aquaculture tank, in a closed, recirculating aquaculture system including (i) respective aqueous medium-containing tanks for successive life-cycle stages of the fish including broodstock conditioning, spawning, egg incubation, larval rearing, nursery processing, and fish grow-out, and (ii) filtration means coupled in closed loop aqueous medium recirculation relationship with the respective tanks, so that aqueous medium from a tank is filtered for purification thereof and returned to the tank, wherein growth conditions are maintained in each of the respective tanks by the steps of:

(a) administering nutritive material to each of the respective tanks containing fish or fish precursor feeding species;

(b) maintaining salinity, dissolved oxygen, pH, temperature and photoexposure within predetermined ranges in each of the respective tanks, with the photoexposure in the grow-out tank substantially exceeding light exposure of a natural wild environment of the fish;

(c) utilizing a hyposaline aqueous medium as the aqueous medium in the grow-out tank; and administering, as needed, gonadotropin-releasing hormone (GnRH) or GnRH agonist (GnRHa) to fish in a sustained release form prior to spawning of the fish in the spawning tank.

* * * * *